United States Patent [19]
Moses

[11] Patent Number: 5,168,392
[45] Date of Patent: Dec. 1, 1992

[54] DYE LASER AMPLIFIER

[75] Inventor: Edward I. Moses, Livermore, Calif.

[73] Assignee: The United States of America as represented by the Department of Energy, Washington, D.C.

[21] Appl. No.: 338,394

[22] Filed: Apr. 14, 1989

Related U.S. Application Data

[63] Continuation of Ser. No. 915,198, Sep. 25, 1986, abandoned.

[51] Int. Cl.$^5$ .............................................. H01S 3/00
[52] U.S. Cl. ..................................... 359/333; 372/53; 372/54; 372/70; 372/72
[58] Field of Search ..................... 330/4.3; 372/53, 54, 372/70, 72

[56] References Cited

U.S. PATENT DOCUMENTS

| | | | |
|---|---|---|---|
| 3,684,979 | 8/1972 | Myer et al. | 372/53 |
| 3,805,187 | 4/1974 | Lempicki et al. | 372/53 |
| 3,873,941 | 3/1975 | Yarborough et al. | 372/53 |
| 3,913,033 | 10/1975 | Tuccio et al. | 372/53 |
| 3,973,213 | 8/1976 | Rockwood et al. | 330/4.3 |
| 4,039,962 | 8/1977 | Hughes | 330/4.3 |
| 4,191,928 | 3/1980 | Emmett | 330/4.3 |
| 4,255,718 | 3/1981 | Herbst | 372/53 X |
| 4,551,684 | 11/1985 | Benhardt | 330/4.3 |

Primary Examiner—Mark Hellner
Attorney, Agent, or Firm—Miguel A. Valdes; Henry P. Sartorio; William R. Moser

[57] ABSTRACT

An improved dye laser amplifier is disclosed. The efficiency of the dye laser amplifier is increased significantly by increasing the power of a dye beam as it passes from an input window to an output window within the dye chamber, while maintaining the intensity of the dye beam constant.

4 Claims, 2 Drawing Sheets ial cornucopia.

DYE LASER AMPLIFIER

FIELD OF THE INVENTION

The United States Government has rights in this invention pursuant to Contract No. W7405ENG48 between the United States Department of Energy and University of California for the operation of the Lawrence Livermore National Laboratory.

This is a continuation of application Ser. No. 915,198 filed Sep. 25, 1986 now abandoned.

BACKGROUND OF THE INVENTION

The present invention relates to an improved dye laser amplifier and method therefor.

Dye laser amplifiers are well known in the prior art and hence the operation of such dye laser amplifiers need not be described in any great detail, other than by means of general observations. Prior art dye laser amplifiers operate with a dye beam input to a dye cell such that the dye beam intensity generally increases across the width of the dye cell. The intensity (generally measured in terms of joules per square centimeter) of the dye beam at the input and output windows, respectively, of the dye cell cannot exceed a damage threshhold which is generally known. That is to say, if the dye beam intensity is greater than a predetermined value at the input and/or output windows of the dye cell, damage can result to the windows and therefore the amplifier itself. Consequently, dye amplifiers are designed with the dye beam having a predetermined "design" intensity value, which is less than the above-referenced threshold. In general, this known threshhold depends upon the material making up each window and its thickness.

As power requirements in dye laser amplifiers continue to increase, such as in laser isotope separation (LIS) processes, the attendant capital costs increase in the form of increased pumping beam power to the dye laser amplifier itself. Consequently, as more pumping beams are required, the capital costs of the overall LIS process greatly increase.

As described above, a typical prior art approach for dye laser amplifiers is for the intensity of the dye beam to gradually increase over the width of the dye cell, while maintaining the dye beam intensity below the known damage intensity values for the input and output windows of the dye cell. This approach has limited the overall. efficiency capability (because of the limit on the dye beam intensity), thus increasing the capital costs.

SUMMARY OF THE INVENTION

It is an object of the present invention to provide an improved dye laser amplifier and method therefor.

It is a more specific object to provide an improved dye laser amplifier which has greatly improved efficiency.

Briefly, the present invention includes means for increasing the power of a dye beam as it crosses from an input window to an output window within a dye cell or chamber without exceeding the damage threshold at either window. This means for increasing can typically be a pumping beam applied to the dye cell to stimulate a lasing action.

The present invention also includes means for maintaining the intensity (in joules per unit area) of the dye beam substantially constant throughout the dye cell, while absolute power increases. This means is provided by exponentially expanding the cross-section of the dye beam across the dye chamber in a way which causes the intensity of the dye beam at the output window to be substantially the same as at the input window even though the power is increasing. In other words, if the power were to be increased across the dye cell without expanding the dye beam's crosssection, the intensity would also increase. By expanding the beam's crosssection, its area is enlarged and thus its intensity does not increase with power. This combination provides for a dramatically increased efficiency of the dye laser amplifier, as will be described below.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
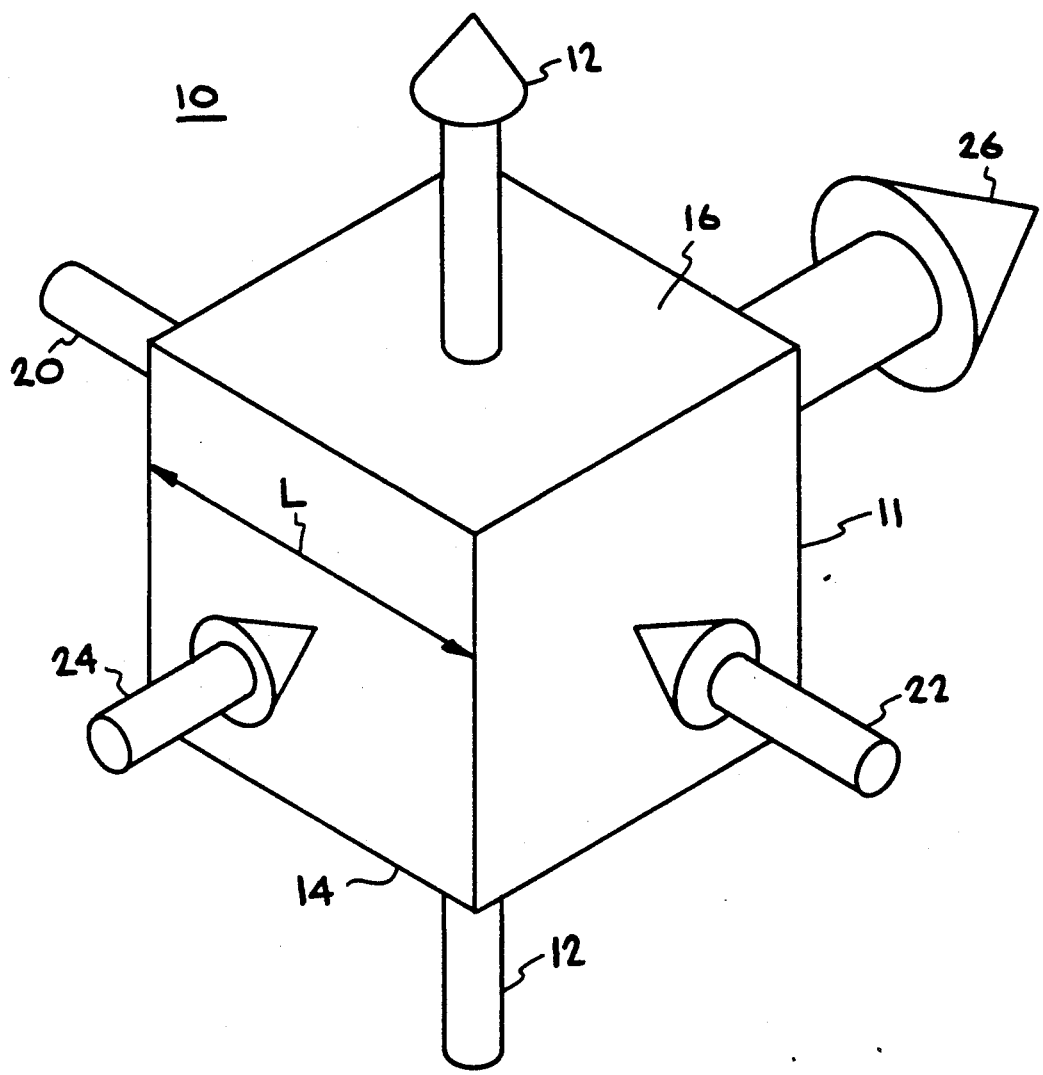
FIG. 1 depicts diagramatically a perspective view of part of a dye laser amplifier.

Referring now to FIG. 1, a perspective view of part of a dye laser amplifier is shown. In FIG. 1, the dye laser amplifier 10 comprises a dye cell 11 in which a dye stream 12 is input and passes through an input window 14 and exits from the dye cell 11 through output window 16. Pump beams 20, 22 are input to dye laser amplifier 10 so as to effect a lasing action on a signal beam 24 to thereby form an amplified beam 26. The operation of the dye laser amplifier 10 in FIG. 1 is known in the prior art and need not be described in any further detail.

The present invention achieves one of the objects of improving the efficiency of dye laser amplifiers by utilizing what applicant refers to herein as a "spatial cornucopia" effect, as will be described below with respect to FIG. 2.

Figure 2:
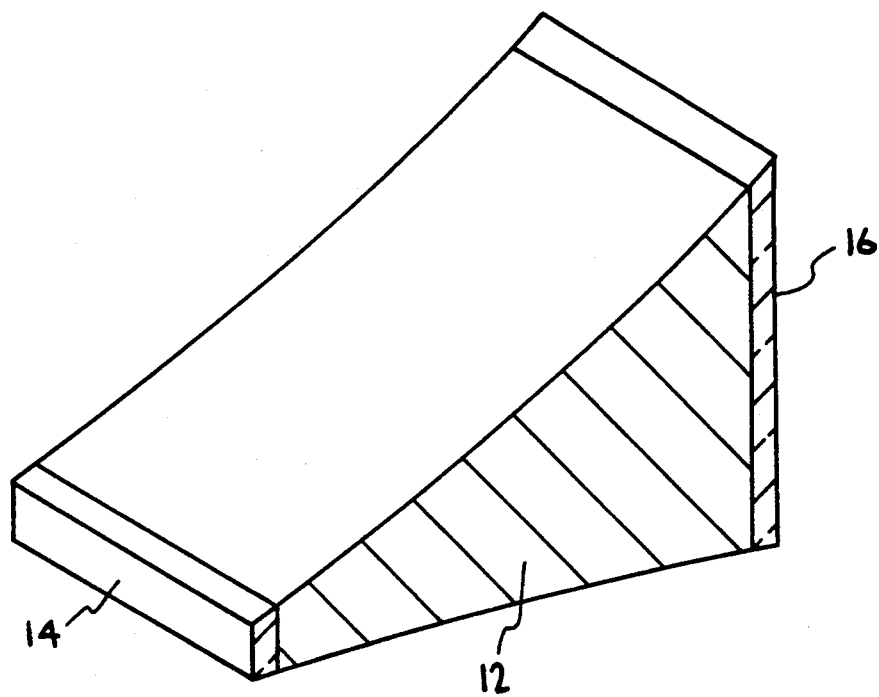
FIG. 2 depicts an improved dye laser amplifier in which the dye beam is input into the dye laser amplifier of FIG. 1 in the form of a spatial cornucopia.

The spatial cornucopia effect in FIG. 2 provides for increasing both the power and cross-sectional configuration of the dye beam, such as dye beam 12 in FIG. 1 in a particular way, as dye beam 12 passes from the input window 14 to the output window 16 within the dye cell 11. More specifically, the intensity of the dye beam is maintained substantially constant by exponentially expanding the crosssection of the dye beam across the dye cell, as illustrated in FIG. 2, even though the power increases. Since the intensity of the dye beam is substantially the same at the output window as it is at the input window, the efficiency of the dye laser amplifier is dramatically increased, because of the increase in power. At the same time, the intensity of the beam is maintained below the damage threshold at the input and output windows.

In one embodiment, the efficiency of a dye laser amplifier has been increased to approximately 60%. Consequently, there can be a dramatic savings in capital costs. One specific application of the present invention is in laser isotope separation processes where copper vapor lasers are utilized for pumping dye laser amplifiers. By increasing the overall efficiency of the dye laser amplifier, there can be a reduction in the input power requirements of the pumping beam, which results in a lesser number of copper metal vapor lasers required for pumping purposes. The reduction in the number of copper vapor lasers required in a laser isotope separation process can provide a substantial reduction in the capital costs in the LIS process.

Figure 3:
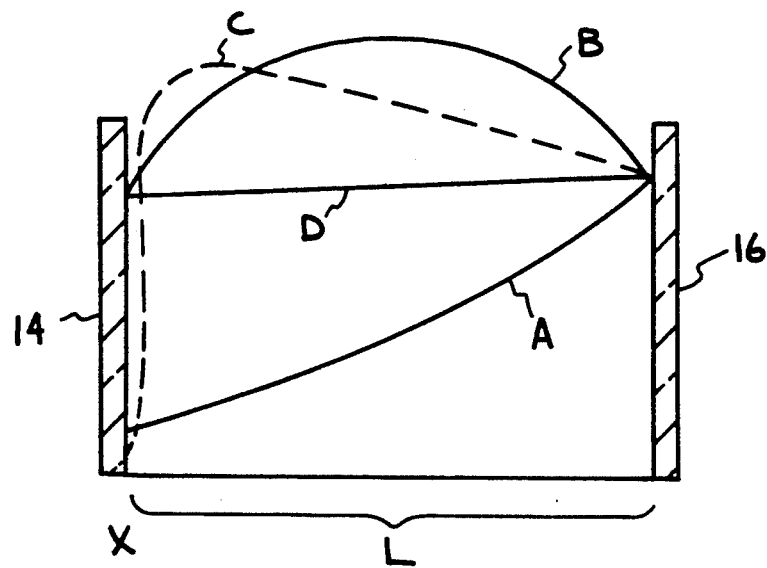
FIG. 3 depicts a graph illustrating the dye beam intensities across the dye cell of FIG. 1.

Referring now to FIG. 3, a graph is depicted therein which further illustrates the aspects of the present invention. In FIG. 3, the "Y" axis represents the normalization of dye beam intensity as contrasted with damage intensity of the input and output windows (d/dD where d represents the intensity of the dye beam and dD represents the damage intensity of the input window). The "X" axis represents the width L of the dye cell from the input window 14 (at the origin O) to the output window 16 (at L) of FIG. 1. As has previously been described, the intensity of a dye beam passing through a dye laser amplifier is "designed" to a certain maximum threshold intensity at the input and output windows, since damage can result if the intensity levels are exceeded. Another way of stating this is that the output and input windows of a dye cell can absorb only a certain level of power from the dye beam before they will be damaged. The present invention permits a dye laser amplifier to operate with the dye beam fully saturated throughout, if at all possible. Because of the limitation on the intensity at the output window, prior art approaches have in general operated at approximately half the saturation, such as illustrated at curve A in FIG. 3. Note that the normalized intensity of the dye beam (curve A) is substantially less at the input than the output and gradually increases (exponentially) between the two. This reduces the overall efficiency of the dye laser amplifier and, because the efficiency is reduced, consequently requires a greater number of pumping beams. This increases the overall costs of any LIS implementation.

It has been found that by utilizing a spatial cornucopia concept the dye beam intensity can be very high at the input window without exceeding the damage threshold at the output window. This is accomplished by expanding the 10 dye beam's crosssection so as to maintain the design intensity criterion such as exemplified in FIG. 3, curves B, C or D. By expanding the crosssection of the beam, the intensity is maintained substantially constant throughout the amplifier (curve D), and by increasing the power of the dye beam across the amplifier or above the threshold level (curves B, C) between the input and output windows, dramatic increases in the overall efficiency of the dye laser amplifier can be attained. The dye beam power is increased across the amplifier while at the same time the intensity or the flux, (in terms of joules per square centimeter) is maintained at a constant or greater than constant high level.

By providing for such an implementation, presently existing dye beam amplifiers need not be changed structurally. Rather, optic devices can be effected by those of ordinary skill in the art to expand the beam in the manner illustrated in FIG. 2 or in any other suitable way in order to provide the intensity curves B, C and D illustrated in FIG. 3, or any other suitable curves. It should also be noted in FIG. 2 that with a "spatial cornucopia" effect, while the dye beam intensity is being maintained substantially constant, the expansion is in a spatial cornucopia just linearly, but rather quadratically.

By providing what could be characterized as an intensity shaded cornucopia, the overall efficiency would increase linearly, so that the overall increase in efficiency would not be as dramatic as that of a spatial cornucopia. Nevertheless, a shaded intensity cornucopia effect is also capable of providing increased efficiency which is an overall objective in any dye laser amplifier application.

The foregoing description of a preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a dye laser amplifier, the method comprising the steps of increasing the power of a dye beam passing from an input window to an output window within a dye cell by applying a pumping base therein, and maintaining the intensity of the beam substantially constant as power increases by exponentially expanding a crosssection of the dye beam in the shape of a spatial cornucopia across the dye chamber, maintaining the intensity of the dye beam at the output window the same as at the input window even though the power increases, and maintaining the intensity below a certain threshold at said input and output windows.

2. In a dye laser amplifier in which a dye beam is caused to pass from an input window to an output window, and in which a stream of dye flows across a dye cell while the dye within the cell is pumped by a pumping beam directed into the stream between said input and output windows in order to increase the power of the power of the dye beam as it exits the output window as compared to its power at the input window, the improvement comprising means for exponentially expanding the crosssection of said dye beam in the shape of a spatial cornucopia between said input and output windows in a controlled manner for controlling its intensity thereacross, means for maintaining the intensity of the dye beam at the output window the same as at the input window even though the power increases, and means for maintaining the intensity below a certain threshold at said input and output windows.

3. An amplifier as in claim 2 wherein the intensity of said dye beam is maintained at least substantially constant across said dye cell.

4. An amplifier as in claim 2 wherein the intensity is greater than said certain threshold between said input and output windows.

* * * * *